United States Patent Office 3,449,566
Patented June 10, 1969

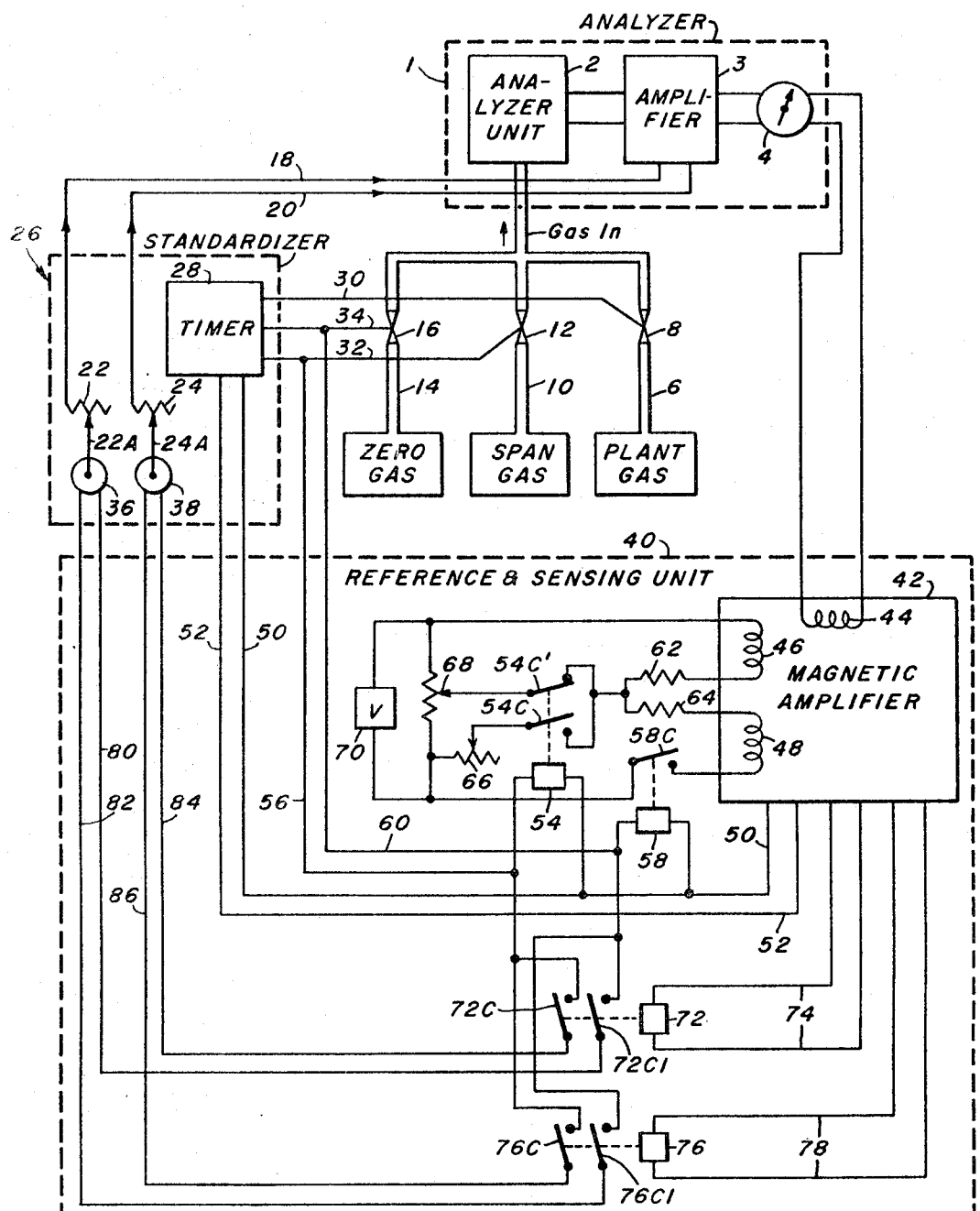

3,449,566
REFERENCE AND SENSING UNIT FOR
AUTOMATIC GAS STANDARDIZERS
William A. Kolb, Forest Hills Borough, and James H.
Wilson, Franklin Township, Westmoreland County, Pa.,
assignors to United States Steel Corporation, a corporation of Delaware
Filed Aug. 25, 1966, Ser. No. 575,162
Int. Cl. G01n 21/26; G01t 1/16; H01j 39/00
U.S. Cl. 250—43.5                                6 Claims

ABSTRACT OF THE DISCLOSURE

A reference and sensing unit for use with the automatic gas standardizer of an infrared gas analyzer uses a dual bi-stable magnetic amplifier as a comparator to compare a reference voltage to a second voltage which indictes the analysis of a calibrating gas. The comparator output actuates a motor operated potentiometer to adjust the second voltage to equal the reference voltage, thus changing the comparator output to zero.

---

This invention relates to a reference and sensing unit for use with automatic standard gas standardizers used in conjunction with infrared gas analyzers. Infrared gas analyzers give constant readings for only a short period of time and hence require periodic calibration to provide reliable analysis. A sample of gas having a very low known percentage of a known gas is introduced into the analyzer and a potentiometer is adjuster to provide the correct reading on the analyzer indicator. Calibration is performed for the zero reading on the analyzer indicator. A sample of test gas having a known percentage of a known gas close to the maximum percent readable on the indicator is then introduced into the analyzer and a second potentiometer adjusted to provide the correact reading on the analyzer indicator. The first test gas is commonly referred to as the "zero" gas and the second test gas as the "span" gas. Calibration is commonly accomplished automatically through the use of an automatic standardizer, a device that initiates the calibration cycle from an internal clock, and programs the various steps of the calibration process.

For each phase of automatic standarization, alarm contacts are required. This may be achieved through the use of mercury or micro-switches on a recorder, or utilizing a contact-making meter. These switches are set for a minimum of 2% dead band so that the calibration is inaccurate.

It is therefore an object of our invention to provide a reference and sensing device to replace the alarm system provided by a recorder or a contact-making meter.

Another object is to provide such a device which can be used for calibration when recording instruments are in remote locations.

A further object is to provide such a device which increases the accuracy of calibration by the use of a smaller "dead band."

Still another object is to provide such a device which calibrates faster than the prior devices.

These and other objects will be more apparent after referring to the following specification and attached drawing, in which:

The single figure is a schematic wiring diagram of our invention.

Referring more particularly to the drawing, reference numeral 1 indicates a conventional infrared gas analyzer such as a Luft type infrared analyzer Model 200 LIRA manufactured by the Mine Safety Appliance Company. The analyzer 1 includes analyzing unit 2 which generates an output electrical signal proportional to the gas analysis, an amplifier 3 connected to the output signal of the unit 2, and an indicator 4 connected to the output of amplifier 3 for indicating the analysis of the gas. The plant gas to be analyzed passes through conduit 6 and an electrically controlled valve 8 to the analyzer unit 2. Span test gas passes through conduit 10 and electrically controlled valve 12 to the analyzer unit 2. Zero test gas passes through conduit 14 and electrically controlled valve 16 to the analyzer unit 2. The amplifier 3 is connected by means of leads 18 and 20 to potentiometers 22 and 24, respectively, which are part of a conventional automatic standardizer 26 also manufactured by the Mine Safety Appliance Company for use with the Model 200 LIRA analyzer. The standardizer 26 also includes a timer 28 connected by means of leads 30, 32 and 34 to electrically controlled valves 8, 12 and 16, respectively. Reversible motors 36 and 38 in standardizer 26 control the position of the arms of potentiometers 22 and 24, respectively. The parts so far described are conventional.

According to our invention we provide a reference and sensing unit 40 which includes a comparator 42 which compares two input signals and generates two selective output signals. It is preferably a dual bi-stable magnetic amplifier such as a Norbatrol PM 100C100G01 manufactured by Norbatrol Electronics Corporation. The amplifier 42 includes a winding 44 connected to the output of amplifier 3 and also windings 46 and 48. Power is supplied through leads 50 and 52 to the sensing unit 40 from the standardizer 26. The relay coil 54 is connected to lead 50 and lead 32 through lead 56. Relay coil 58 is connected to lead 50 and to lead 34 through lead 60. Resistors 62 and 64 are provided in series between windings 46 and 48. Relay coil 54 has contacts 54C and 54C1 which are connected in series with the arms of potentiometers 66 and 68, respectively. A reference voltage supply 70 such as a No. 36589–1 manufactured by Honeywell Incorporated is connected to windings 46 and 48. Contact 58C of relay coil 58 is connected in series with winding 48. Potentiometer 68 is connected across the leads of voltage supply 70. Relay coil 72, having normally open contacts 72C and 72C1, is connected to amplifier 42 through leads 74. A relay coil 76, having normally open contacts 76C and 76C1, is connected by leads 78 to amplifier 42. Motor 36 is connected through lead 80, contact 72C1 and lead 60 to lead 34. Motor 36 is connected through lead 82, contact 76C1 and lead 60 to lead 34. Motor 38 is connected through lead 84, contact 72C and lead 56 to lead 32. Motor 38 is connected through lead 86, contact 76C and lead 56 to lead 32.

In normal operation, valve 8 is opened by energization of lead 30 and the gas to be analyzed passes continuously through the valve 8 to the analyzer 2. At this time valves 12 and 16 are closed by deenergization of leads 32 and 34. The timer 28 of standardizer 26 is set for periodic calibration as desired. At the set time, the timer 28 will close valve 8 by deenergization of lead 30 and open valve 16 by energization of lead 34. Thus, only zero gas will pass to the analyzer 2 through the valve 16 with the analysis being displayed on indicator 4. The output of the amplifier 3 is connected to the amplifier winding 44. When the timer 28 opens valve 16 it also energizes relay coil 58 through leads 50 and 60, thus closing its contact 58C. This places a reference voltage from voltage supply 70 across windings 46 and 48 through resistors 62 and 64. The zero set point is determined by the potentiometer 68. If the net ampere turns of winding 44 are greater than the sum of the ampere turns on windings 46 and 48, relay 72 will be energized closing its contact 72C and 72C1. This completes a circuit to motor 36 through leads 80 and 60 to lead 34. Motor 36 will move arm 22A of potentiometer 22 until the output of amplifier 3 is such that the ampere turns on winding 44 equals the sum of the ampere turns on the windings 46 and 48. At this time relay 72 will be deenergized by the magnetic amplifier 42. If the net ampere turns of winding 44 are less than the sum of the ampere turns on windings 46 and 48 relay 76 will be energized by the magnetic amplifier 42, thus closing the contacts 76C and 76C1. This will complete a circuit to motor 36 through leads 82 and 60 to lead 34 so as to drive the motor 36 in the opposite direction which will raise the output of amplifier 3 until the ampere turns on winding 44 equals the ampere turns on windings 46 and 48. At this time relay 76 will be deenergized by the magnetic amplifier 42. The timer 28 then closes valve 16 and deenergizes relay 58 which completes the zero calibration. The timer 28 also opens valve 12 by energization of line 32. Span gas then flows through conduit 10 and valve 12 into the analyzer unit 2 displaying the analysis on the indicator 4. At the same time relay 54 is energized through lines 50 and 56, thus closing contact 54C and opening contact 54C1. This places the reference voltage from voltage supply 70 across winding 46 through resistor 62. The span set point is determined by the potentiometer 66. If the ampere turns of winding 44 are larger than the ampere turns of winding 46 relay 72 will be energized supplying power to the motor 38 through leads 84, 56 and 32. This causes motor 38 to move rheostat arm 24A to change the setting of indicator 4 until the ampere turns on winding 44 equals those on winding 46. If the ampere turns on winding 44 are less than the ampere turns on winding 46 relay 76 will be energized closing its contacts 76C and 76C1. This supplies power to motor 38 through leads 86, 56 and 32, thus causing the motor 38 to rotate in the opposite direction so as to raise the output of amplifier 3 until the ampere turns on windings 44 and 46 are equal. At the completion of the span calibration the timer 28 closes valve 12 and opens valve 8 so that analyzing of the plant gas is resumed. We have found that the dead band is a maximum of 1% with our device as compared to 2% with the prior devices.

While one embodiment of our invention has been shown and described, it will be apparent that other adaptations and modifications may be made without departing from the scope of the following claims.

We claim:
1. In the combination of an infra-red gas analyzer including an amplifier having an electrical output, and an automatic standardizer for said analyzer connected to said amplifier: a reference and sensing unit comprising a comparator for two input signals adapted to selectively generate two output signals, a source of variable reference voltages, means connecting the reference voltage source to give an input signal to said comparator, means connecting the said amplifier output to said comparator to give a second input signal, and means responsive to the output signals from said comparator for varying the amplifier output.

2. The combination of claim 1 in which said comparator is a dual bi-stable magnetic amplifier.

3. The combination of claim 1 in which said analyzer includes an analyzing unit having an output electrical signal proportional to the gas analysis connected to said amplifier, means for delivering gas to be analyzed to said analyzing unit, a first valve for controlling flow of said gas to said analyzing unit, means for delivering test gas to said analyzing unit, and a second valve for controlling flow of test gas to said analyzing unit; said automatic standardizer including a motor operated potentiometer connected to said amplifier and a timer for opening and closing said valves: said reference and sensing unit including means operable by said timer when it closes said first valve and opens said second valve to connect a preset voltage from said voltage source to said comparator, and means responsive to unbalance between the inputs to said comparator for changing the setting of said motor operated potentiometer until said inputs balance to thereby vary the amplifier output.

4. The combination of claim 3 in which said comparator is a dual bi-stable magnetic amplifier.

5. The combination of claim 1 in which said analyzer includes an analyzing unit having an output electrical signal proportional to the gas analysis connected to said amplifier, an indicator connected to the output of said amplifier for indicating the analysis of the gas, a first conduit having a control valve therein for controlling flow of gas to be analyzed to said analyzing unit, a second conduit having a control valve therein for controlling flow of zero test gas to said analyzing unit, and a third conduit having a control valve therein for controlling flow of span test gas to said analyzer; said standardizer including a first motor operated potentiometer connected to said amplifier, a second motor operated potentiometer connected to said amplifier, and a timer for opening and closing said valves; said reference and sensing unit including means operable by said timer when it closes said first valve and opens said second valve to connect a preset voltage from said voltage source to said comparator, means responsive to unbalance between the inputs to said comparator for changing the setting of said first motor operated potentiometer until said inputs balance to thereby vary the indicator setting, means operable by said timer when it closes said second valve and opens said third valve to connect a second preset voltage from said voltage source to said comparator, means then responsive to unbalance between the inputs to said comparator for changing the setting of said second motor operated potentiometer until said inputs balance to thereby vary the indicator setting.

6. The combination of claim 5 in which said comparator is a dual bi-stable magnetic amplifier.

References Cited

UNITED STATES PATENTS 3,211,913 10/1965 Bolmgren _____ 250—43.5
3,229,094 1/1966 Brys _____ 250—83.3

RALPH G. NILSON, *Primary Examiner.*

U.S. Cl. X.R.

250—83.3